United States Patent [19]

Traub

[11] 4,231,578
[45] Nov. 4, 1980

[54] SEAL ASSEMBLY

[75] Inventor: Henry A. Traub, Pacific Palisades, Calif.

[73] Assignee: W. S. Shamban & Co., Santa Monica, Calif.

[21] Appl. No.: 32,525

[22] Filed: Apr. 23, 1979

[51] Int. Cl.³ .......................... F16J 15/24; F16J 15/32
[52] U.S. Cl. ................................... 277/121; 277/176; 277/177; 277/194; 277/205; 277/188 A
[58] Field of Search .......................... 277/115, 117–122, 277/144, 145, 152, 153, 176, 165, 170–172, 188 R, 188 A, 190, 191, 193, 194, 205, 177

[56] References Cited

U.S. PATENT DOCUMENTS

| 3,718,338 | 2/1973 | Traub | 277/176 X |
| 3,765,690 | 10/1973 | Sievenpiper | 277/121 |
| 3,848,880 | 11/1974 | Tanner | 277/176 |
| 4,027,816 | 6/1977 | Slator et al. | 277/205 X |
| 4,053,166 | 10/1977 | Domkowski | 277/205 X |

FOREIGN PATENT DOCUMENTS

| 923013 | 4/1963 | United Kingdom | 277/176 |
| 1455141 | 11/1976 | United Kingdom | 277/121 |

*Primary Examiner*—Robert S. Ward, Jr.
*Attorney, Agent, or Firm*—Martin R. Horn

[57] ABSTRACT

A sealing assembly, designed primarily for both very low and high pressure sealing of a rod while either stationary or reciprocating, comprising a first sealing ring having a generally Y-shaped cross-sectional configuration and a second sealing ring having a generally L-shaped cross-sectional configuration. One arm of the Y-shaped sealing ring seals in the static mode. The other arm seals in the static mode and also serves as a wiper arm wiping fluid off the surface of the reciprocating rod in the dynamic mode. This wiper arm is provided with a sharp wiping edge which in cooperation with the L-shaped sealing ring maintains both a higher loading per unit area and a high rate of pressure rise at the contact with the rod for maximum leakage control at both low pressure and high pressure. The L-shaped sealing ring also restricts and controls the deformation of the wiper arm so as to maintain an optimum contact area between the wiper and rod surface thereby minimizing friction and wear therebetween. The Y-shaped sealing ring is preferably made of a relatively flowable material such as rubber while the L-shaped sealing ring is preferably made of polytetrafluorethylene to provide good sealing characteristics and low friction at high pressures. The seal is designed to take advantage of the good characteristics of rubber and polytetrafluorethylene while retaining almost none of the disadvantages of either.

9 Claims, 8 Drawing Figures

SEAL ASSEMBLY

BACKGROUND OF THE INVENTION

1. Field of the Invention

The invention described herein relates to sealing assemblies for effecting a fluid seal between relatively movable parts both in the static and dynamic mode and is particularly directed to sealing a reciprocating piston rod in both high and low pressure conditions.

2. Description of the Prior Art

Ideally, a seal should provide an effective sealing capability under static and dynamic conditions, at both very low and high pressure, with a minimum of breakway friction and running friction and with a long maintenance free service life. Seal assemblies of the type designed as an attempt to meet this ideal, may be typified by that shown in the U.S. Pat. No. 3,848,880 to Tanner issued Nov. 19, 1974 and U.S. Pat. No. 4,053,166 to Domkowski issued Oct. 11, 1977. The devices disclosed therein are believed to be the closest prior art to the applicant's invention. Such seal assemblies are designed to incorporate materials which have good high pressure sealing, friction, wear and extrusion resistance characteristics but poor low pressure sealing ability, with materials which exhibit good low pressure sealing ability but poor friction, wear and extrusion characteristics. Typically, such combination sealing devices will overcome some of the limitations of each seal material but not to a degree that would characterize these combinations as a significant improvement over so called conventional sealing devices. The typical material used to effect the good high pressure sealing characteristics is Teflon, and for low pressure sealing an elastomeric material such as rubber (synthetic or natural) is generally used.

Generally speaking such seals exhibit a number of undesirable qualities because their design relies predominantly on combining the properties of the seal materials and less on seal design. Under static conditions (no movement of the reciprocating element) leakage is a function of the pressure drop across the seal and the dimensions of the spaces between the seal and the surface to be sealed. These spaces are a function of the unit loading and the area of contact. For obvious reasons elastomeric materials require a lower contact force than less resilient materials for the same sealing effect. The same is generally true under dynamic conditions (movement of the reciprocating element such as a rod). However, the spaces between the seal and the surface to be sealed tends to be greater in proportion to the thickness of the fluid film moving under the seal on the surface of the rod. The film thickness is not only a function of the unit loading and contact area but also the rate of pressure rise of the unit loading at the point of initial seal contact with the reciprocating surface. The foregoing is general knowledge.

When designing a rod seal for a typical hydraulic actuator, the seal must be effective at low pressure in the static mode as the rod extends, and at high pressure as the rod retracts. The difficulty lies in providing for enough contact area (footprint) and contact pressure (unit loading) of the elastomeric element of the seal assembly to prevent low pressure static leakage while also ensuring a sharp sealing edge. The sharp sealing edge produces a high rate of pressure rise at the point of initial elastomeric seal contact to minimize fluid film thickness between the seal and rod as the rod extends. Too high a unit loading will blunt the sharp edged seal contact line and cause a low rate of pressure rise and thus less effective leakage control.

Typically, as the pressure on the rod seal rises during rod retraction, the unit loading and area of contact of the elastomer increases which increases friction and wear and shortens service life.

Examples of this dilemma are evident from an examination of Tanner and Domkowski. Tanner uses both diametral interference and high squeeze (unit loading) and a broad contact area (footprint) to ensure low pressure sealing. No sharp line of contact is provided to reduce film thickness as the rod extends. The rubber contributes significantly to the friction of the seal assembly. The inherent large difference between static and dynamic friction levels of the elastomer results in a jerky movemnet of the rod which is unacceptable in close tolerance positional control devices. Service life is materially reduced due to wear during high pressure operation and resultant increased contact area.

Domkowski provides diametral interference of the elastomeric lip element but no radial squeeze at lip contact with the rod in an effort to reduce friction and wear and ensure smooth motion. This design is typical of U-Ring designs with limited low pressure sealing ability. At low pressures, the unit loading and rate of pressure rise at the sealing surface is below the level required for the elastomer to prevent leakage. The movement of a reciprocating element, such as a rod, past the rubber sealing member will therefore drag a thin film of fluid past the rubber seal with the rod. At high pressure, the rubber member is distorted such that even more surface area of the rubber seal is brought into contact with the relatively moving rod. This produces additional and significant friction and contributes prominently to the difference between the static and dynamic friction levels of the seal assembly. The seal is thus less suited for use in close tolerance positional control devices because of the increased jerky operation. Additionally, wear of the elastomer because of high pressure exposure to the moving rod will shorten service life.

It is thus an object of the present invention to provide a seal assembly which forms a superior seal at very low pressures as well as very high pressures and all pressures in between in both the static and dynamic mode.

It is a further object of this invention to provide a low friction, long wearing seal assembly at all presures which results in minimal difference between the static friction and dynamic friction between the seal and moving member.

SUMMARY OF THE INVENTION

A seal assembly for installation in an annular sealing gland having a low pressure side and a high pressure side. The seal assembly comprises first and second annular sealing rings. The first sealing ring has a substantially L-shaped cross-sectional configuration, the base portion of which is installed in the low pressure side of the gland. The arm portion extends axially from the radially inward side of the base portion toward the high pressure side of the gland. The free end of the arm portion tapers radially inwardly toward the high pressure side. The second annular sealing ring has a substantially Y-shaped cross-sectional configuration, the body portion of which has an inside diameter slightly greater than the outside diameter of the arm portion of the first sealing ring and an outside diameter slightly greater than the outside diameter of the base portion of the first sealing ring. Thus, the second annular sealing ring may be seated concentrically upon the arm portion of the first sealing ring and the body portion will project slightly radially outward beyond the base portion of the first sealing ring. The two arm portions of the second annular sealing ring span a radial distance greater than the distance between the inside and outside diameters of the base portion of the first sealing ring. Upon installation, the two arm portions and the body portion of the second annular sealing ring are thus slightly compressed within the sealing gland. The two arm portions extend toward the high pressure side of the gland and beyond the tapered end of the arm of the first sealing ring and a portion of one of the two arms rests upon the tapered portion of the free end of the first sealing ring.

In a first alternate embodiment, the base of the first sealing ring may be concentrically sectioned to permit easy installation of the assembly into a gland which does not open at either the high pressure side or the low pressure side.

In a second alternate embodiment, the juxtaposed surfaces of the two sealing rings may define at least one annular passageway so as to permit the second sealing ring when subject to high pressure to compress and cause one of the two arm portions to lift up out of contact with the surface which it normally seals under low pressure.

DESCRIPTION OF THE PREFERRED EMBODIMENTS

Figure 1:
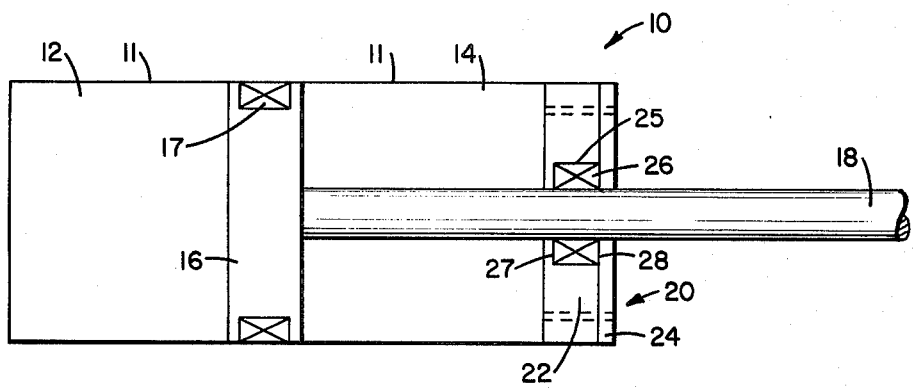
FIG. 1 illustrates a hydraulically actuated piston and rod, the typical environment for the present invention.
Figure 7:
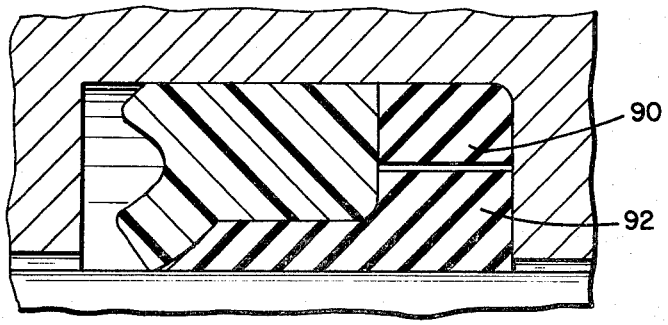
FIG. 7 shows an alternate embodiment in which one of the sealing rings is concentrically segmented for easy installation in a non-openable sealing groove.
Figure 8:
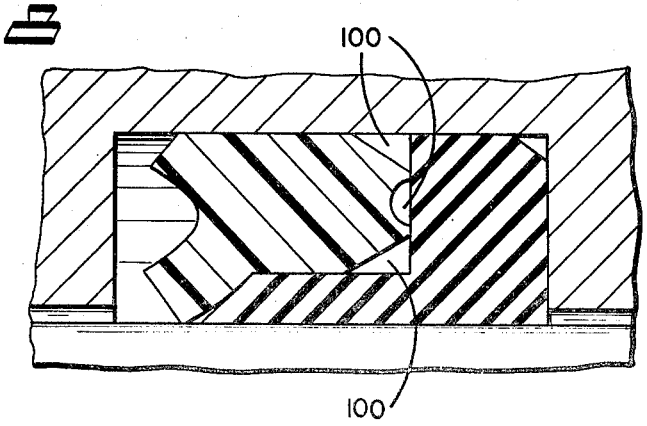
FIG. 8 illustrates the use of an annular passageway to permit compression of one of the seal rings.

The environment in which the sealing assembly of the present invention is generally intended to operate is illustrated in FIG. 1. A hydraulically actuated cylindrical piston assembly 10 has cylinder walls 11 which define a first chamber 12 and a second chamber 14. As shown in FIG. 1 chamber 12 is referred to as the high pressure chamber and chamber 14 is referred to as the low pressure chamber. These two chambers are separated by a piston 16 which is sealed against the cylinder walls 11 by a sealing assembly 17. Attached to the piston 16 and extending through the second chamber 14 and beyond the cylindrical piston assembly is a piston rod 18. The second chamber 14 is closed by means of a cylinder head 20 which may comprise a first member 22 and a second member 24, which together define a sealing groove or seal gland 25 within which is housed a rod seal assembly 26. The sealing groove 25 has a high pressure side 27 which is the side of the sealing groove which is nearest the second chamber 14, and has a low pressure side 28 which is that side of the sealing groove 25 which is furthest away from the second chamber 14. As shown in FIG. 1 the sealing groove 25 is an openable groove in that the member 24 may be removed from the cylinder head thereby allowing full and complete access to the sealing groove 25. This sealing groove 25 should be compared to the sealing groove as shown in FIGS. 7 and 8 where the three walls of the cylinder groove are defined by a single unitary structure and access to such a groove is therefore somewhat more difficult. The sealing groove shown in FIGS. 7 and 8 may be referred to as a non-openable sealing groove.

Piston rod 18 may be attached to a load, the position of which may be controlled by varying the position of the piston 16 within the cylindrical piston assembly 10. The position of the piston 16 may be adjusted by appropriately pressurizing chambers 12 and 14. Typically chambers 12 and 14 are filled with a hydraulic fluid. By supplying hydraulic fluid under high pressure to chamber 12 the piston 16 and piston rod 18 will be caused to extend toward the right in FIG. 1 thereby controlling the position of the load attached to the piston rod. To retract the piston rod 18, hydraulic fluid is supplied to chamber 14 under higher pressure than is the hydraulic fluid in chamber 12 thereby causing the piston 16 and piston rod 18 to be moved to the left as shown in FIG. 1. As the piston rod 18 is extended it is readily apparent that a thin film of hydraulic fluid may adhere to the surface of the piston rod 18 and be drawn with the piston rod past the seal assembly 26 thereby causing a leak of hydraulic fluid out of chamber 14. On the return stroke of piston rod 18, chamber 14 and seal assembly 26 are subjected to high pressure. The thin film of hydraulic fluid will tend to accumulate at the outer edge of the rod seal assembly 26 which seals tightly under high pressure and when sufficient hydraulic fluid accumulates, it will drip from the seal assembly 26 and evidence the existence of the slight leak of hydraulic fluid past the rod seal assembly 26.

Figure 2:
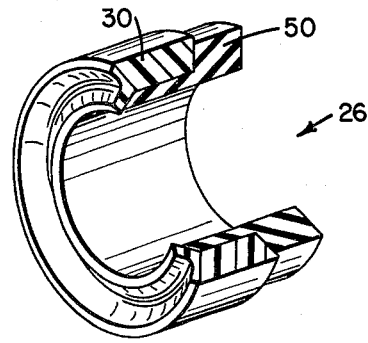
FIG. 2 illustrates the seal assembly in its free state.

The design of the seal assembly 26 of the present invention is intended to as nearly as possible eliminate the thin film of hydraulic fluid which may adhere to the piston rod 18 and be dragged with it past the seal assembly 26 and accumulate on the return stroke of the piston rod. One embodiment of the design of such a seal is shown in FIG. 2 in a cutaway perspective view. The seal assembly 26 comprises two annular sealing rings, the first of which has a generally L-shaped cross-sectional configuration and is designated 50 in FIG. 2. The second of such annular sealing rings has a generally Y-shaped cross-sectional configuration and is designated 30 in FIG. 2. As shown in FIG. 2 it should be readily apparent that the annular sealing assembly 26 has an axial direction and a radial direction both of which may be referenced to the axial centerline of the seal assembly 26.

Figure 3:
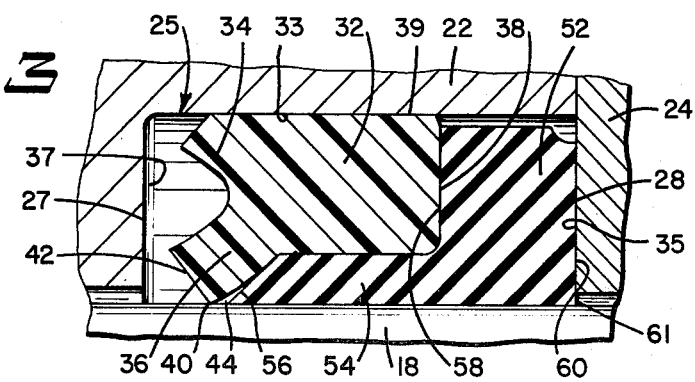
FIG. 3 shows the seal assembly installed in an openable sealing groove.

FIG. 3 gives a detailed cross-sectional illustration of how the seal assembly 26 of FIG. 2 would appear if it were installed in the sealing groove 25 of FIG. 1. The sealing groove 25 is shown as defined by a first member 22 and a second member 24 which together define the axially extending wall 33 of the sealing groove, a first radially extending wall 35 and a second radially extending wall 37. The second radially extending wall 37 is located on the high pressure side 27 of the sealing groove 25 and the first radially extending wall 35 is located on the low pressure side 28 of the sealing groove 25. The annular sealing ring 30 is substantially of Y-shaped cross-sectional configuration and comprises a body portion 32, a first arm portion 34 and a second arm portion 36. The body portion 32 terminates in a radially extending surface 38 and has an axially extending surface 39 which upon installation of the sealing assembly 26 in the seal groove 25 is in compressive contact with the axially extending wall 33 of the sealing groove 25. The second arm member 36 has a first surface 42 and a second surface 44 which intersect to form an edge 40 of the second arm 36.

The other annular sealing ring 50 illustrated in FIG. 3 is of substantially L-shaped cross-sectional configuration and has a base portion 52 which is positioned in the low pressure side 28 of the seal groove 25 and also has an arm portion 54 extending from the base portion on the inside radial edge of said base portion. The arm portion 52 terminates in a tapered portion 56 which extends beneath the second arm 36 of the other sealing ring 30 and defines an acute leading edge. The base portion 52 of the generally L-shaped sealing ring 50 has a first radially extending surface 58 which is juxaposed with the surface 38 of the other sealing member 30. The base portion also is provided with a second generally radially extending surface 60 which in the embodiment illustrated in FIG. 3 abuts the radially extending wall 35 on the low pressure side of the sealing groove 25.

When the piston rod 18 is being extended, the hydraulic fluid in chamber 14 is under low pressure, and when the piston rod is being retracted, the hydraulic fluid in the chamber 14 is under high pressure. Since the seal assembly 26 which is placed in the sealing groove 25 is subjected to the same pressure which is present in the chamber 14, it is desirable that any seal assembly 26 which is placed in the sealing groove 25, exhibit acceptable sealing performance under both low and high pressure conditions. A substance which is know for its capability of sealing under high pressure is polytetrafluorethelene (such as Teflon). Under high pressure this substance tends to flow into very minute surface defects and thereby effect a very good seal under high pressure. This substance also exhibits very low friction coefficient and thus tends to run cool and has a long service life. A substance which exhibits good low pressure sealing characteristics is rubber. However, under high pressure, rubber tends to distort and because of the high friction coefficient of rubber under high pressure the rubber seal would run hot and would tend to have a very short service life. The seal assembly 26 shown in FIG. 3 makes use of both the desirable Teflon sealing characteristics and the desirable rubber sealing characteristics and by virtue of the design of the seal assembly disclosed herein, takes advantage of the best features of each while minimizing the undesirable features of each. The unique design of the seal assembly further provides for a nearly equal static and dynamic friction between the seal assembly and the piston rod 18, thus resulting in a very smooth movement of the piston rod both while being extended and on the return stroke. The seal assembly shown in FIG. 3 is thus designed to provide a most efficient seal at both low and high fluid pressures and in addition, to provide a very smooth movement of the piston rod so as to be suitable for use in applications requiring precision positional control of the piston rod 18.

Under low hydraulic pressure such as is present when the piston rod 18 is being extended, the Teflon sealing ring 50 does not present an effective seal. In the absence of the rubber sealing ring 30, a thin film of hydraulic fluid would adhere to the surface of the piston rod 18 and be drawn past the Teflon sealing ring 50 on the surface of the piston rod 18. Since on the return stroke the hydraulic fluid in chamber 14 would be under high pressure, the Teflon sealing ring 50 would then form a very effective seal and as the piston rod 18 was drawn back past the Teflon sealing ring, the now effective Teflon sealing ring 50 would prevent the thin surface layer of hydraulic fluid from re-entering the chamber 14 and moreover cause the hydraulic fluid to accumulate at the edge 61 of the Teflon sealing ring 50 until such time as enough fluid had accumulated to cause the fluid to drip from the piston rod. In order to prevent the hydraulic fluid from being drawn past the Teflon sealing ring when the seal assembly 26 is subjected to low hydraulic fluid pressure a second sealing ring 30 made of rubber is used in combination with the Teflon sealing ring. As shown in FIG. 3 this rubber sealing ring 30 is provided with wiper arms 36 and 34 which in the installed condition are slightly compressed. It is thus evident that the sealing capability of the wiper arms is not pressure dependent. Furthermore, the wiper arm 36 is provided with a relatively sharp sealing edge 40 formed by surfaces 42 and 44. This sharp sealing edge 40 causes a rapid rate of pressure rise at the initial line of contact. This means that as the fluid encounters the leading edge of the seal it is met with a rapidly increasing unit compressive loading between the sealing edge and the piston rod. This rapid increase is essential for a minimum fluid film thickness passing under arm 36. The area of the wiper arm 36 in contact with the piston rod 18 is minimized by the surface 56 of arm 54 which limits the contact of surface 44 of wiper arm 36 with the piston rod 18 thereby producing a maximum load per unit area and permitting high compressive force on arm 36 without blunting the sharp edge 40. Under low pressures the wiper arm 36 thus prevents the thin film of hydraulic fluid from adhering to the surface of the piston rod 18 and thus on the return stroke of the piston rod 18 there is little or no hydraulic fluid to accumulate on the edge 61 of the Teflon sealing ring 50. The seal assembly shown in FIG. 3, thus relies on the rubber sealing ring 30 for its low pressure sealing characteristics and relies on the Teflon sealing ring 50 for its high pressure sealing characteristics. By virtue of the unique design of the seal assembly shown in FIG. 3, the area of contact between the rubber seal ring 30 and the piston rod 18 is held to a minimum and thus the frictional contribution of the rubber seal ring 30 to that of the overall seal assembly 26 is held to a minimum. This is true whether the seal assembly is subjected to high pressures or low pressures. By virtue of the sloped portion 56 of the Teflon seal 50 which partially supports the wiper arm 36 of the rubber seal ring 30 out of contact with the piston rod 18 the friction in the high pressure condition is minimized. Since the frictional contribution of the rubber seal ring is minimal under all conditions, the frictional characteristics of the overall seal assembly 26 take on the appearance of being the frictional characteristics primarily attributable to the Teflon sealing ring 50. Thus the static and dynamic frictional forces between the seal assembly 26 and the piston rod 18 are as nearly equal as practical thereby making the extension and retraction of the piston rod 18 as smooth as possible having very minimal jerking motion if any at all.

The seal assembly 26 as shown in FIG. 3 is also an effective seal under static conditions, that is under conditions where the piston rod 18 is being neither retracted nor extended. In this situation the rubber sealing ring 30 will shield against a leak which would otherwise occur due to imperfection or scratches in the surface of the Teflon sealing ring 50. Such imperfections would normally require a substantial time to self heal under high pressure and would thereby result in undesirable leakage. Because the seal assembly 26 utilizes a rubber sealing ring 30 having the wiper arms 34 and 36 which are slightly compressed when installed in the seal groove 25, the seal assembly will also prevent leaks under a no-load condition. This is so because the sealing characteristics of the rubber sealing ring 30 are not pressure dependent, they are totally dependent upon the compression exerted on the rubber sealing ring 30 by reason of its confinement within the seal groove 25.

The above described seal assembly 26 comprising a combination of a rubber seal 30 and a Teflon seal 50 exhibits a coefficient of friction which is slightly greater than that of an all Teflon seal assembly and yet substantially less than that of an all rubber seal assembly. Because of this fact, the seal assembly 26 will run cooler and thereby has a longer service life than would an all rubber seal assembly.

Figure 4:
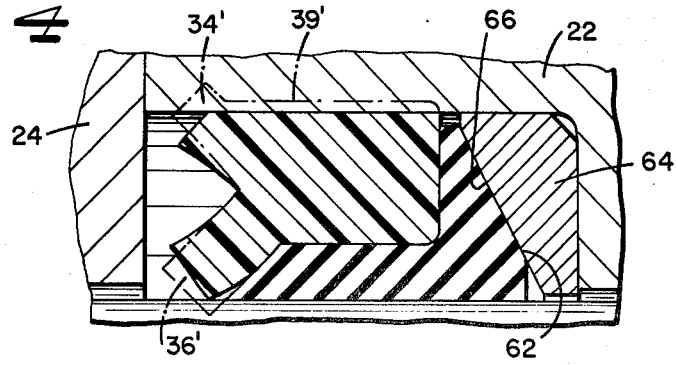
FIG. 4 shows the seal assembly slightly modified to accommodate a cam ring.

FIG. 4 illustrates the seal assembly as slightly modified to accommodate the use of a cam ring 64. To accommodate the sloped surface 66 of the cam ring, the Teflon sealing ring 50 is provided with a sloped surface 62. These surfaces complement one another such that the entire seal assembly can then be accommodated within a generally rectangular seal groove 25. The cam ring 64 is typically constructed of a material having a high modulus of elasticity that is substantially higher than the Teflon sealing ring 50. Also illustrated in FIG. 4 is the free state of the rubber sealing ring 30. As shown, the rubber sealing ring in its unconfined state would have an axially extending surface 39' which would extend beyond the outer radial dimension of the Teflon sealing ring 50. In addition, the wiper arms 34 and 36 in the free state would be in an expanded state as shown by wiper arms 34' and 36' such that they would span a radial distance greater than the radial distance spanned by the sealing groove 25.

Figure 5:
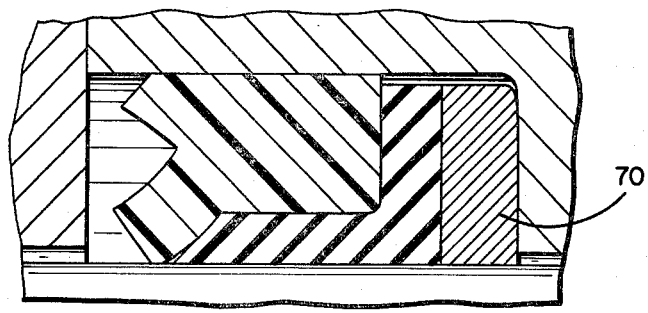
FIG. 5 shows the use of a back-up ring with the seal assembly.

As shown in FIG. 5, the Teflon sealing ring 50 may also be slightly modified to accommodate within a given sealing groove 25, a back-up ring 70. The back-up ring 70 is also preferably constructed of a material having a modulus of elasticity substantially higher than the modulus of elasticity of the Teflon sealing ring 50. As shown in each of FIGS. 3, 4 and 5, the wiper arm 36 of the rubber sealing ring 30 is supported along a portion of its length out of contact with the piston rod 18 by means of a sloped portion of the Teflon sealing ring 50, thus limiting the maximum amount of surface area of the piston rod 18 that can be contacted by the wiper arm 36, even in the high pressure condition. Because of this construction, the frictional contribution of the rubber sealing ring 30 to the overall frictional characteristics of the seal assembly 26 is minimal.

Figure 6:
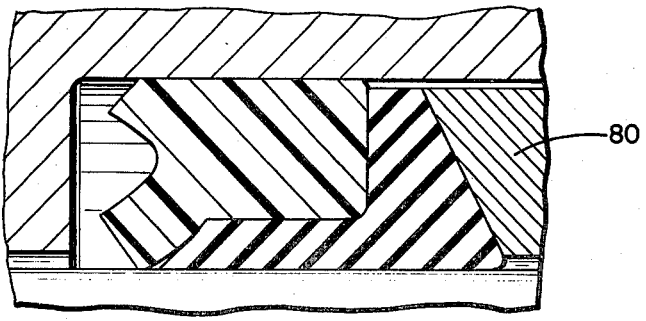
FIG. 6 shows a modified seal assembly which accommodates a tapered seal groove wall.

As shown in FIG. 6 the embodiment of the seal assembly 26 illustrated in FIG. 4 may also be used to seal a sealing groove 25 having the configuration shown in FIG. 6. The sealing groove in FIG. 6 has a sloped low pressure side sealing groove wall defined by the member 80 which essentially performs the same function as was performed by the cam ring 64 and the member 22 in FIG. 4. The sealing grooves shown in FIGS. 3, 4, 5, and 6 may all be referred to as accessable or openable sealing grooves in that the grooves are constructed in a manner to permit one end wall such as the low pressure wall or the high pressure wall to be removed from the cylinder head assembly 20 thereby permitting easy access to the interior of the sealing groove 25. The sealing grooves shown in FIGS. 7 and 8 may be contrasted with those in FIGS. 3-6 in that the groove in FIGS. 7 and 8 is made entirely of an integral member and neither the low pressure sealing groove wall nor the high pressure sealing groove wall can be removed from the cylinder head assembly in order to allow easy access to the seal groove. In such a situation, it may be somewhat difficult to insert the Teflon sealing ring 50, which is somewhat rigid, into the sealing groove 25. In order to facilitate the insertion of a rigid Teflon sealing ring into the sealing groove where the groove is defined by a unitary structure, the Teflon sealing ring 50 may be constructed in two separate sections such as section 90 and section 92 as shown in FIG. 7. The construction shown in FIG. 7 is very similar to that shown in FIG. 3 as far as the seal assembly 26 is concerned, except that the Teflon sealing ring has been segmented so as to form two sections which can be concentrically mounted within the sealing groove 25. In order to install the sealing assembly 26, wherein the Teflon sealing ring 50 is comprised of two sealing rings such as 90 and 92, the sealing ring 90 is first inserted in the sealing groove, followed by the insertion of the rubber sealing ring 30 and finally the second portion 92 of the Teflon sealing ring is inserted into the sealing groove 25 and adjusted to take on the configuration shown in FIG. 7. By segmenting the Teflon sealing ring 50 into two separate sealing rings 90 and 92, the individual portions become much more flexible than is the unitary Teflon sealing ring 50 shown in FIG. 3, thereby facilitating the insertion of the overall seal assembly 26 within a sealing groove 25 which is not easily accessable.

As discussed earlier with reference to FIG. 3, the unique design of the sealing assembly therein described permits the piston rod 18 to be extended and retracted with a very minimum of jerky motions due to the fact that the static and dynamic friction levels are nearly equal. An improvement on the embodiment of the seal assembly 26 of FIG. 3 which further equalizes the static and dynamic frictional levels is illustrated in FIG. 8. FIG. 8 illustrates the use of an annular groove 100 or void defined by the juxaposed radially extending surfaces of the Teflon sealing ring 50 and the rubber sealing ring 30. The purpose of these voids is to permit the rubber sealing ring 30 to be distorted and compressed under high pressure so as to partially fill the void 100 thereby causing the rubber sealing ring 30 to flex sufficiently so as to lift the wiper arm 36 out of contact with the piston rod 18. In this manner under high pressures, the rubber sealing ring 30 makes no frictional contribution whatsoever to the frictional characteristics of the overall seal assembly 26. Under high pressure then, the overall seal assembly 26 behaves as if the entire seal assembly 26 were of Teflon. The seal assembly 26 thus exhibits a static and dynamic frictional level which are very nearly equal. This embodiment, even more so than the embodiment of FIG. 3, thus exhibits a very smooth retraction of the piston rod 18 having virtually no jerking motions whatsoever even under slight adjustments of position and under conditions of light or heavy load. It is of course contemplated that such annular passageways or voids could be constructed, as shown in FIG. 8, either along the corners or in the central portion of the radical surface of the rubber sealing ring 30. Such voids or grooves 100 could also occur between the juxaposed axially extending surfaces of the rubber sealing ring 30 and the Teflon sealing ring 50. The seal assembly shown in FIG. 8 thus forms an effective low pressure seal which exhibits very little frictional contribution due to the wiper arm 36. The seal assembly also forms a very efficient and effective high pressure seal which exhibits zero frictional contribution form the rubber sealing ring 30 since under high pressure conditions the rubber sealing ring 30 is caused to distort in a manner so as to lift the wiper arm 36 off of the surface of the piston rod 18.

There has thus been described and illustrated a seal assembly 26 which exhibits very efficient sealing characteristics at both low and high pressure extremes. Such a sealing assembly has been tested and shown to produce a leakage rate of less than one drop of hydraulic fluid per five thousand cycles of the piston rod 18. These results are valid over a range of piston rod sizes varying from a ⅜ inch diameter rod to a 3 to 4 inch diameter rod having a stroke length on the order of 3 inches and cycling at a rate of 60 cycles per minute. Such a seal assembly is effective over a pressure range varying from 25 pounds per square inch up to 10,000 pound per square inch. The leakage rate for a seal assembly of the present configuration will of course vary somewhat depending upon the diameter of the piston rod 18. It should be noted however, that for the seal assembly of the present configuration, the frictional levels are very low and the seal will tend to run cooler than previous seal assemblies. The cooler running seal will of course exhibit a longer service life than seals which are run at elevated temperatures. It should be pointed out that in order to maximize the efficiency of the sealing edge of the wiper arm 36, the wiper arm 36 is subjected to a separate manufacturing step known as skiving wherein a blade is used to trim away a portion of the wiper arm 36 in a manner to insure a sharp sealing edge 40. This greatly increases the efficiency of the wiper arm under low pressure conditions since the loading per unit area is thereby maximized.

Although the present invention has been described in connection with the particular embodiments of FIGS. 1-8, it is to be expressly understood that many alterations, modifications, and other permutations and combinations may be made by those having ordinary skill in the art without departing from the spirit and scope of the present invention. For example, there are shown in FIG. 8 annular passageways or voids 100 which have been formed by grooves placed in the surface of the rubber sealing member 30. It is obvious that these annular passageways may alternatively be provided in the juxtaposed surface of the Teflon sealing ring 50 without substantially altering the performance of the seal assembly 26. The only real requirement being that a space be provided such that the rubber sealing ring 30 may be compressed into it in a manner so as to distort the rubber sealing ring 30, thereby raising the wiper arm 36 away from the surface of the piston rod 18. It should again be obvious that the rubber sealing ring 30 having such annular passageways or voids may be employed in any one of the embodiments illustrated in the other FIGS. 1-7, provided only that in FIG. 7 appropriate precautions be taken such that the space between the sealing ring 90 and sealing ring 92 does not coincide with the location of such annular passageway or groove. If such were the case, undue distortion and possible deterioration of the rubber sealing ring 30 might occur.

What is claimed is:

1. A seal assembly having a low pressure side and a high pressure side, said seal assembly comprising:
   a first annular sealing ring having a substantially L-shaped cross-sectional configuration, the base portion of which has a first end and a second end and defines the low pressure side of said seal assembly, the arm portion of said L-shaped sealing ring extending axially from said first end of said base portion, said arm portion having a first side coplanar with said first end of said base portion and having a second side, the free end of said arm portion tapering to form an acute edge on said first side of said arm portion;
   a second annular sealing ring having a substantially Y-shaped cross-sectional configuration, the body portion of which has a first side and a second side, the distance between which is greater than the distance between the second end of said base portion and the second side of said arm portion of said L-shaped annular sealing ring, said second annular sealing ring being seated concentrically upon said first annular sealing ring such that said second side of said body of said second annular sealing ring confronts said second side of said arm portion of said first annular sealing ring;
   said second annular sealing ring having two arm portions each of which has an outermost corner, said corners spanning a distance greater than the distance between said first and second end of said base of said first annular sealing ring;
   said two arm portions extending toward the high pressure side of said seal assembly, one of said two outermost corners extending just beyond the edge of said arm of said first annular sealing ring whereby substantially all the length of one of said two arms rests upon the tapered portion of the free end of the arm of said first annular sealing ring.

2. A seal assembly according to claim 1 wherein said first annular sealing ring comprises two separate members; an annular sealing member of generally rectangular cross-section and; an annular sealing member of generally L-shaped cross-section, the base portion of said L-shaped member being mounted concentrically within the annular sealing member of generally rectangular cross-section.

3. The seal assembly according to claim 1 wherein one of either said second side of said arm portion or said second side of said body of said second annular sealing ring is provided with an annular groove which in combination with the other of said second sides defines an annular passageway.

4. The seal assembly according to claim 1 wherein said first annular sealing ring is provided with a first radially extending surface joining the second end of said base portion and the second side of said arm portion, said body portion of said second annular sealing ring is provided with a second radially extending surface joining said first and second sides of said body portion, one of either said first radially extending surface or said second radially extending surface being provided with an annular groove therein which in combination with the other of said first and second radially extending surfaces defines an annular passageway.

5. A seal assembly of claim 4 in combination with two relatively movable members having contiguous surfaces, one of which surfaces has an annular groove juxtaposed to the other surface, said annular groove having a low pressure side and a high pressure side, said seal assembly for effecting a seal between said members, said seal assembly being installed within said groove such that:

said base portion of said first annular sealing ring abuts the radially extending wall on said low pressure side of said annular groove;

said arm portion of said first annular sealing ring is in spaced relationship with, and parallel to, the axially extending surface of said annular groove; and said one of said two outermost corners, which extends just beyond the edge of said arm of said first annular sealing ring, is in contact with said other surface.

6. The combination of claim 5 wherein said second annular sealing ring is partially compressed into said annular passageway when said seal assembly is subjected to high fluid pressure.

7. The combination of claim 6 wherein said partial compression of said second annular sealing ring into said annular passageway causes said one of said two outermost corners, which extends just beyond the edge of said arm of said first annular sealing ring, to be lifted out of contact with said other surface.

8. The seal assembly of claim 1 in combination with an annular sealing groove defined by a first member, and a second member:

said first member defining the axially extending surface and one end wall of said sealing groove;

said second member defining the second end wall of said sealing groove; and a third member having a surface juxtaposed to said sealing groove formed by said first member and said second member;

said seal assembly being held in spaced apart relationship from said low pressure side of said sealing groove by a back up ring.

9. The combination of claim 8 wherein the surface of said base portion which is nearest said low pressure side of said sealing groove is at least in part sloped away from the radial direction, and said back up ring is provided with a complimentary sloped surface for contacting said sloped surface of said base portion.

* * * * *